United States Patent

[11] 3,603,515

| [72] | Inventors | Gunther Lohmann<br>Eglsee;<br>Alfons Guminski, Amberg, both of,<br>Germany |
|---|---|---|
| [21] | Appl. No. | 803,352 |
| [22] | Filed | Feb. 28, 1969 |
| [45] | Patented | Sept. 7, 1971 |
| [73] | Assignee | Luitpoldhutte Aktiengesellschaft<br>Amberg, Germany |
| [32] | Priority | Mar. 1, 1968 |
| [33] | | Germany |
| [31] | | P 16 08 344.6 |

[54] FRAGMENTING SCRAP METAL
6 Claims, 2 Drawing Figs.

[52] U.S. Cl. .................................................. 241/100,
164/270, 164/286, 241/101, 241/266
[51] Int. Cl. ........................................................B02c 18/00,
B02c 13/00, B02c 19/12
[50] Field of Search .......................................... 241/30,
100, 101, 190, 236, 264–9, DIG. 22, 199; 225/1,
97, 103, 104; 164/70, 117, 262, 286, 299–301,
270; 30/134; 18/DIG. 46

[56] References Cited
UNITED STATES PATENTS

| 2,043,328 | 6/1936 | Mosshart.................. | 241/236 X |
| 2,523,558 | 9/1950 | Cavallier................... | 164/300 |
| 3,101,045 | 8/1963 | Endert....................... | 241/266 X |
| 3,284,896 | 11/1966 | Reichborn-Kjennerud.. | 30/134 |

Primary Examiner—Donald G. Kelly
Attorney—Hammond & Littell

ABSTRACT: Fragmenting elongated pieces of scrap metal by means of multiple number of arms operating in scissorlike fashion. The fragmenting apparatus is mounted on the framework of a centrifugal casting machine and acts periodically to break accumulated strips of scrap metal dumped from the casting machine running channel onto the framework. The fragmented pieces then fall to a collection trough from which they are subsequently removed for remelting.

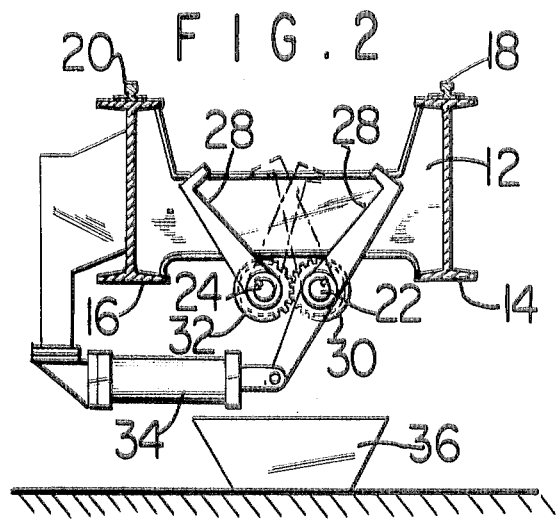
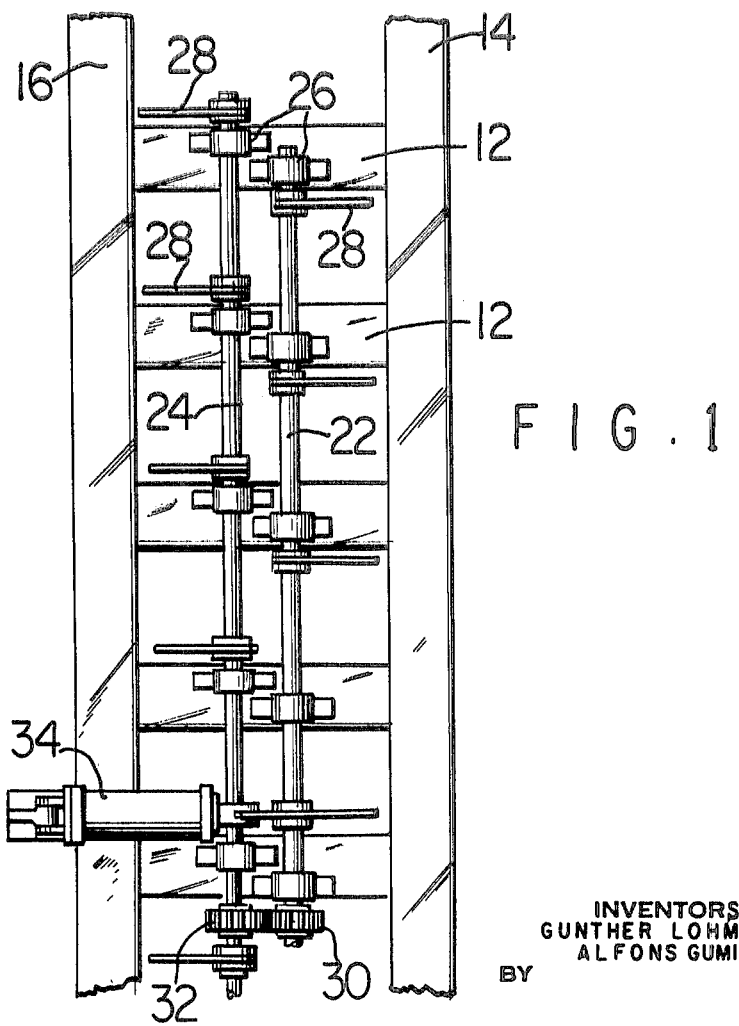

FRAGMENTING SCRAP METAL

BACKGROUND OF THE INVENTION

In centrifugal casting machines for casting pipe, a tilting ladle, holding slightly more metal than is required to form one pipe, is fixed at the head of each machine. This ladle may be tilted at a predetermined speed and the metal made to flow at a given rate down a fall spout into a long runner channel which projects into the mold. The rate of movement of the centrifugal casting machine away from the ladle is adjusted in relation to the rotation of the mold in order to obtain a pipe of desired thickness.

In centrifugal casting processes, such as the Laveaux process, the runner channel is at least as long as the pipe that is manufactured. Even when the metal is maintained at an optimum constant molding temperature, a residue of the metal remains at the bottom along the entire length of the channel. This metal hardens into an elongated strip which must be removed before commencing the succeeding molding sequence by means of scraping or impacting.

In order to avoid the necessity for removing the scrap metal strips by scraping or impacting means, it is customary to tilt the running channel and dispose of the scrap metal strips onto the machine bed which consists of longitudinal frame members supporting the rails on which the molding machines ride, and transversely disposed bulkheads for reinforcing the bed structure. The problem herein resides in the fact that the scrap metal strips are so long that they cannot fall between the bulkheads. As additional scrap metal strips are disposed of onto the bed, the strips rapidly accumulate to the point where manufacture of the pipes must be interrupted in order to remove the scrap metal. This interruption is costly in terms of unexploited production time and facilities and consequently, in terms of diminished productivity of the manufacturing plant.

OBJECTS OF THE INVENTION

It is an object of this invention to increase productivity of a centrifugal pipe casting operation by providing for automatic and efficient removal of scrap metal from the bed structure of the casting machines.

It is another object of this invention to provide apparatus for fracturing and crushing the scrap metal which falls onto the bed foundation of the casting machine.

It is still another object of this invention to provide apparatus for clearing the bed structure of a centrifugal casting machine of scrap metal during break periods.

A further object of the invention is the provision of apparatus for fragmenting scrap metal wherein the scrap metal is subsequently remelted without any further crushing or fragmentation.

THE INVENTION

This invention relates to apparatus for crushing or fragmenting scrap metal strips deposited on the bed structure or framework of a centrifugal casting machine. The scrap metal is fragmented by means of a plurality of spaced arms which are actuated in the same or in opposite directions. The arms are mounted on one or separate shafts which are provided with gears. These gears mesh and are actuated by a single drive means. The action of the fragmenting arms in breaking up the scrap metal strips is analogous to the action of scissors when cutting.

For a more specific description of the invention, reference is made to the drawings, wherein FIG. 1 is the elevation view of the framework which supports the centrifugal pipe casting machine; and FIG. 2 is a view of a section of FIG. 1.

The apparatus of the present invention consists of a framework which supports the centrifugal pipe casting machine. The framework is defined by transverse bulkheads 12 which are positioned in alignment in spaced relationship. A pair of I-beams 14, 16 are disposed on the sides of bulkheads 12 and rails 18, 20 are laid on the I-beams. The centrifugal pipe casting machine rides on rails 18, 20 to and from a ladle. Between I-beams 14, 16 is mounted a pair of shafts 22, 24 which are securely attached to the framework or the floor by means such as roller bearings 26. A plurality of spaced fragmenting arms 28 are rigidly mounted on each shaft in spaced relationship. Each shaft also carries meshing gears 30, 32 which cause rotation of the shafts in unison in opposite directions. Secured to the framework, as illustrated in FIG. 2, is a double-acting cylinder 34 adapted for actuating one of the shafts. Since the shafts are coupled to each other through meshing gears 30, 32, actuation of one of the shafts will transmit the impulse through the gears to the other shaft and cause it to rotate in the opposite direction.

Operation of the herein described apparatus is self-evident from the drawings. The scrap metal is deposited on the framework or the bed structure shown in elevation in FIG. 1. Since the scrap metal is in the form of elongated members, they remain disposed on the framework. When a quantity of the scrap metal has been accumulated, cylinder 34 is actuated to rotate the shafts in opposite directions. As the shafts are caused to rotate, arms 28 are also caused to rotate and to sweep the scrap metal into the zone located between the advancing arms. As this action continues, the scrap metal is compressed gradually until the point where it fractures into smaller fragments. If these fragments are small enough, they fall through the framework and into trough 36. The shafts are rotated until the arms are in the position shown in dotted lines in FIG. 2. At this point, all the scrap metal has been crushed or fragmented into small pieces which have fallen into the trough 36. When the scrap metal on the framework has been disposed of, the cylinder 34 is again actuated to rotate the shafts in opposite directions and thus to retract the arms into inoperative condition. To crush scrap metal, which may have become wedged in the apparatus, it may be desirable to repeat the operation described above to rid the framework of the scrap metal. This sequence of steps is repeated over and over again with each accumulation of the scrap iron on the framework.

We claim:

1. Apparatus for fragmenting elongated strips of scrap metal disposed on the framework of a centrifugal pipe casting machine comprising a plurality of fragmenting means comprising a plurality of spaced arms rigidly affixed to a pair of shafts positioned on said framework and mounted in a spaced relationship on the said framework and activating means for effecting operation of said fragmenting means to cause fragmentation of elongated strips of scrap metal disposed on the framework.

2. Apparatus of claim 1 including meshing gears on each of said shafts; said actuating means comprising a double-action cylinder operatively secured to one of said shafts whereby actuation of said one shaft causes actuation of the other shaft through said meshing gears.

3. Apparatus for fragmenting and crushing strips of scrap metal disposed on the framework of a centrifugal pipe casting machine comprising a pair of shafts disposed lengthwise in spaced relationship on said framework; means rigidly and rotatably securing said shafts in place; a plurality of spaced arms rigidly mounted on each of said shafts; a gear provided on each of said shafts, said gears being in mesh and coupled in operative relationship; and actuating means operatively connected to one of said shafts whereby, upon actuation, said shafts are caused to rotate in opposite directions which, in turn, causes said arms to rotate in opposite directions and to crush said scrap metal in scissorlike manner whereby said scrap metal falls through said framework.

4. Apparatus of claim 3 wherein said arms on said shafts are mounted in pairs, one on each shaft, in offset relationship.

5. Apparatus of claim 4 wherein said actuating means is a double-acting cylinder.

6. Apparatus of claim 5 including a trough means below said framework for collecting said fragmented strips of scrap